(12) United States Patent
Soshino et al.

(10) Patent No.: US 11,492,046 B2
(45) Date of Patent: Nov. 8, 2022

(54) ROOF STRUCTURE OF VEHICLE

(71) Applicant: Honda Motor Co., Ltd., Tokyo (JP)

(72) Inventors: Hironori Soshino, Tokyo (JP); Koh Shida, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/469,907

(22) Filed: Sep. 9, 2021

(65) Prior Publication Data
US 2022/0073148 A1 Mar. 10, 2022

(30) Foreign Application Priority Data
Sep. 10, 2020 (JP) .............................. JP2020-152334

(51) Int. Cl.
*B62D 25/06* (2006.01)
*B62D 27/02* (2006.01)

(52) U.S. Cl.
CPC ............ *B62D 25/06* (2013.01); *B62D 27/023* (2013.01)

(58) Field of Classification Search
CPC .............................. B62D 25/06; B62D 27/023
USPC .................... 296/29, 210, 203.02, 203.04
See application file for complete search history.

(56) References Cited

U.S. PATENT DOCUMENTS 11,142,257 B2 * 10/2021 Hida ..................... B62D 27/02

FOREIGN PATENT DOCUMENTS

| JP | 5711313 B2 * | 4/2015 | ............ B62D 25/04 |
| JP | 6393304 | 9/2018 | |
| JP | 2020131847 A * | 8/2020 | ............ B62D 25/04 |

* cited by examiner

*Primary Examiner* — Dennis H Pedder
(74) *Attorney, Agent, or Firm* — JCIPRNET (57) ABSTRACT

Provide is a roof structure of a vehicle, in which, a roof side outer panel, a roof panel, and a rear garter panel are joined. The roof side outer panel has: a roof joint surface portion, an up-down direction joint surface portion, and a front-back direction joint surface portion. The roof panel is joined to the roof joint surface portion in a state of being abutted against the roof joint surface portion. The up-down direction joint surface portion is formed at a lower end of the roof joint surface portion, and the rear garter panel is joined to the up-down direction joint surface portion. The front-back direction joint surface portion is formed at back ends of the up-down direction joint surface portion and the roof joint surface portion in a vehicle body front-back direction, and is joined to the rear garter panel.

8 Claims, 9 Drawing Sheets

ROOF STRUCTURE OF VEHICLE

CROSS REFERENCE TO RELATED APPLICATIONS

This application claims the priority benefit of Japanese Patent Application No. 2020-152334, filed on Sep. 10, 2020. The entirety of the above-mentioned patent application is hereby incorporated by reference herein and made a part of this specification.

BACKGROUND

Technical Field

The disclosure relates to a roof structure of a vehicle.

Related Art

As a roof structure of a vehicle, a configuration is known in which a laser is irradiated from the outer side of a vehicle body in a state that an inclined surface, obtained in a way that left and right side edges of a roof panel are bent downward and inward in a vehicle width direction, is abutted against the same inclined surface of a side panel (hereinafter, referred to as a roof side outer panel), and base materials are melted and continuously bonded. In addition, a front edge and a back edge of the roof panel also form a joint surface that is bent downward.

Here, with regard to the roof panel, for example, a front edge flange that forms the joint surface of the front edge is press-molded integrally with the inclined surface. In order to press-mold the inclined surface that is bent downward and inward in the vehicle width direction together with, for example, the front edge flange, a notch (hereinafter, referred to as a recess) is required on the end portion side of the front edge flange in the vehicle width direction. The recess is disposed between the front edge flange and a side edge flange having the inclined surface.

Therefore, a gap is formed between an opening frame panel and the recess between the front edge flange and the side edge flange. The gap is blocked by a foaming material or the like. In order to reduce the filling amount of the foaming material or the like, a raised portion that is raised toward the front edge flange side is formed on the opening frame panel side (for example, see Patent literature 1).
[Literature of related art]

PATENT LITERATURE

[Patent literature 1] Japanese Patent No. 6393304

SUMMARY

However, in the roof structure of a vehicle of Patent literature 1, a mold structure in which the raised portion raised toward the front edge flange side is formed on the opening frame panel side becomes complicated, the degree of freedom in design is reduced.

The disclosure aims to provide a roof structure of a vehicle that can simplify a press-molding mold, has a high degree of freedom in design, and can sufficiently reduce a gap formed between a roof panel and a roof side outer panel.

In order to solve the problems, the disclosure proposes the following methods.

(1) A roof structure of a vehicle according to the disclosure is a roof structure (for example, a roof structure 10 of an embodiment) of a vehicle in which the following panels are joined: a roof side outer panel (for example, a roof side outer panel 16 on the left side and a roof side outer panel 18 on the right side of the embodiment); a roof panel (for example, a roof panel 15 of the embodiment) which is arranged on the inner side of the roof side outer panel in a vehicle width direction; and an opening frame panel (for example, in a case of back end portions of the roof side outer panels in a vehicle body front-back direction, the opening frame panels are a rear garter panel 17 on the left side and a rear garter panel 19 on the right side of the embodiment) which is arranged at end portions of the roof panel and the roof side outer panel in the vehicle body front-back direction. With regard to the roof side outer panel, the following portions are continuously formed: a roof joint surface portion (for example, a roof joint surface portion 22 of the embodiment) to which the roof panel is joined in the vehicle body front-back direction in an abutted state; an up-down direction joint surface portion (for example, an up-down direction joint surface portion 23 of the embodiment) which is formed at a lower end of the roof joint surface portion (for example, a lower edge 22a of the roof joint surface portion of the embodiment) and to which the opening frame panel is joined in an up-down direction; and a front-back direction joint surface portion (for example, a front-back direction joint surface portion 24 of the embodiment) which is formed at end portions of the up-down direction joint surface portion and the roof joint surface portion in the vehicle body front-back direction, and is joined to the opening frame panel in the vehicle body front-back direction.

According to the configuration, the roof joint surface portion, the up-down direction joint surface portion, and the front-back direction joint surface portion are integrally and continuously formed on the roof side outer panel. The roof panel is joined to the roof joint surface portion in the vehicle body front-back direction in a state of being abutted against the roof joint surface portion. The up-down direction joint surface portion is formed at the lower end of the roof joint surface portion. The opening frame panel is joined to the up-down direction joint surface portion in the up-down direction.

Furthermore, the front-back direction joint surface portion is formed at the end portions of the up-down direction joint surface portion and the roof joint surface portion in the vehicle body front-back direction. The opening frame panel is joined to the front-back direction joint surface portion in the vehicle body front-back direction.

That is, a three-surface combination portion of the roof joint surface portion, the up-down direction joint surface portion, and the front-back direction joint surface portion can be integrally and continuously formed on the roof side outer panel to join the roof panel and the opening frame panel.

In this way, because the strength and rigidity of the three-surface combination portion of the roof joint surface portion, the up-down direction joint surface portion, and the front-back direction joint surface portion are improved on the roof side outer panel, a distance in the up-down direction from the roof panel abutted against the roof joint surface portion to the up-down direction joint surface portion can be suppressed to be small. That is, by moving the up-down direction joint surface portion upward, a gap formed between the opening frame panel and the roof panel, and the roof side outer panel can be sufficiently reduced.

Furthermore, according to the roof structure, the roof joint surface portion, the up-down direction joint surface portion, and the front-back direction joint surface portion can be set small on the roof side outer panel, and thus press-molding can be easily performed.

Additionally, a press-molding mold can be simplified and the degree of freedom in design can be increased.

(2) The roof side outer panel may include an intersection end corner portion (for example, a back end corner portion 25 of the embodiment) which is formed in a way that the roof joint surface portion, the up-down direction joint surface portion, and the front-back direction joint surface portion are intersected with each other.

According to the configuration, the roof joint surface portion, the up-down direction joint surface portion, and the front-back direction joint surface portion are intersected with each other, and thereby the intersection end corner portion is formed. The intersection end corner portion is formed with high rigidity by the intersection of the three joint surface portions. Accordingly, the rigidity of the roof side outer panel can be increased by the intersection end corner portion. Thereby, for example, a load caused by vertical vibration transmitted from the opening frame panel can be supported by the intersection end corner portion, and can be further distributed from the intersection end corner portion to the entire region of the roof side outer panel. The three-surface combination portion also has the same effect.

(3) The up-down direction joint surface portion may include a joint apex portion (for example, a joint apex portion 27 of the embodiment) which is formed in a way that a distance (for example, an apex portion distance W1 of the embodiment) from the roof joint surface portion to an outer peripheral edge (for example, an inclined edge 27c of the embodiment) is gradually reduced toward the intersection end corner portion.

Here, the intersection end corner portion is a part in which the roof joint surface portion, the up-down direction joint surface portion, and the front-back direction joint surface portion are continuously intersected with each other, and is a part in which press-molding is difficult. Thus, in the up-down direction joint surface portion, the joint apex portion is formed in a way that the distance from the roof joint surface portion to the outer peripheral edge is gradually reduced toward the intersection end corner portion. Thereby, the intersection end corner portion (that is, the roof joint surface portion, the up-down direction joint surface portion, and the front-back direction joint surface portion) can be easily formed by press-molding.

(4) The front-back direction joint surface portion may include: a projecting flange (for example, a projecting flange 31 of the embodiment) that projects in a way of contacting along the opening frame panel from an end portion of the roof side outer panel in the vehicle body front-back direction; and a joint seat portion (for example, a joint seat portion 32 of the embodiment) which projects from the projecting flange to the opposite side of the end portion of the roof side outer panel and is joined to the opening frame panel. The projecting flange may be formed to have a minimum width (for example, a minimum width W2 of the embodiment) within a range in which the roof joint surface portion, the up-down direction joint surface portion, and the front-back direction joint surface portion of the roof side outer panel are capable of being press-molded.

According to the configuration, within a range in which the roof joint surface portion, the up-down direction joint surface portion, and the front-back direction joint surface portion can be press-molded, the projecting flange of the front-back direction joint surface portion is formed to have the minimum width. Thereby, the press-molding of the roof joint surface portion, the up-down direction joint surface portion, and the front-back direction joint surface portion can be improved. Additionally, weight reduction can be achieved by forming the projecting flange into the minimum width.

(5) The opening frame panel may include: a vertical wall (for example, a vertical wall 52 of the embodiment) to which the front-back direction joint surface portion is joined; and a horizontal wall (for example, a horizontal wall 53 of the embodiment) which extends along the up-down direction joint surface portion from the vertical wall and is joined to the up-down direction joint surface portion.

According to the configuration, the vertical wall of the opening frame panel is joined to the front-back direction joint surface portion, and the horizontal wall is joined to the up-down direction joint surface portion. Here, the vertical wall is vertically disposed, and the horizontal wall is horizontally disposed. Accordingly, the vertical wall and the horizontal wall are disposed in a way of being intersected with each other. Thereby, joining strength between the opening frame panel and the roof side outer panel can be increased.

(6) The opening frame panel may include a stepped portion (for example, a first stepped portion 54 and a second stepped portion 55 of the embodiment) which is formed in a stepped shape along an outer peripheral edge (for example, an outer peripheral edge 31a and the inclined edge 27c of the embodiment) of the roof side outer panel.

According to the configuration, the stepped portion (a bead or the like) of the opening frame panel is formed (shaped) in a stepped shape along the outer peripheral edge of the roof side outer panel. Thereby, the opening frame panel and the roof side outer panel can be assembled along the stepped portion having a stepped shape, and the assembly work of the opening frame panel and the roof side outer panel can be facilitated.

(7) The opening frame panel may include a seat surface portion (for example, a seat surface portion 56 of the embodiment) which is disposed separately from the up-down direction joint surface portion and is positioned with respect to the roof side outer panel.

According to the configuration, the seat surface portion positioned with respect to the roof side outer panel is formed on the opening frame panel, and the seat surface portion is disposed separately from the up-down direction joint surface portion. Thereby, by using the seat surface portion, a joint position between the opening frame panel and the up-down direction joint surface portion can be accurately determined.

(8) The roof panel may include: an abutment joint portion (for example, an abutment joint portion 37 of the embodiment) which is joined to the roof joint surface portion in the vehicle body front-back direction in a state of being abutted against the roof joint surface portion; and a garter joint surface portion (for example, a garter joint surface portion 38 of the embodiment) which is joined to the opening frame panel in the vehicle body front-back direction.

According to the configuration, the abutment joint portion of the roof panel is joined to the roof joint surface portion of the roof side outer panel in the vehicle body front-back direction in a state of being abutted against the roof joint surface portion of the roof side outer panel. Furthermore, the garter joint surface portion of the roof panel is joined to the opening frame panel in the vehicle body front-back direction.

Thereby, the strength and rigidity of the roof structure of a vehicle which is configured by the roof side outer panel, the roof panel, the opening frame panel, and the like can be increased.

According to the disclosure, the press-molding mold can be simplified, the degree of freedom in design can be high, and the gap formed between the roof panel and the roof side outer panel can be sufficiently reduced.

DESCRIPTION OF THE EMBODIMENTS

Hereinafter, a roof structure of a vehicle according to one embodiment of the disclosure is described with reference to the drawings. In the drawings, an arrow FR indicates the front side of the vehicle, an arrow UP indicates the upper side of the vehicle, and an arrow LH indicates the left-hand side of the vehicle. It should be noted that the usage, type and the like of the vehicle are not limited, and an automobile is described as an example in one embodiment. In addition, in the embodiment, a roof structure 10 of a vehicle is abbreviated as "the roof structure 10" to describe.

<Vehicle>

Figure 1:
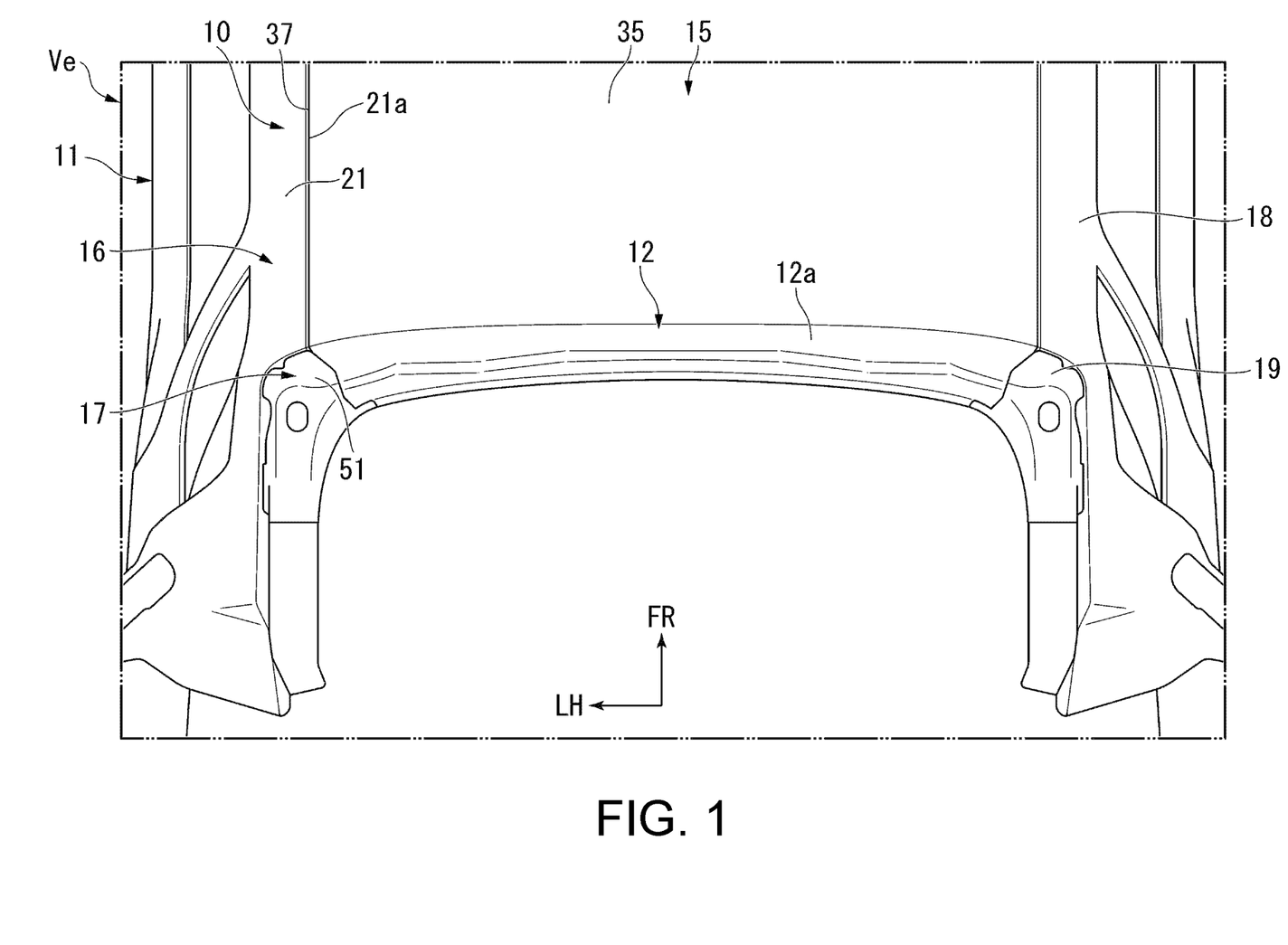
FIG. 1 is a plan view of a vehicle including a roof structure of a vehicle of one embodiment according to the disclosure.
Figure 2:
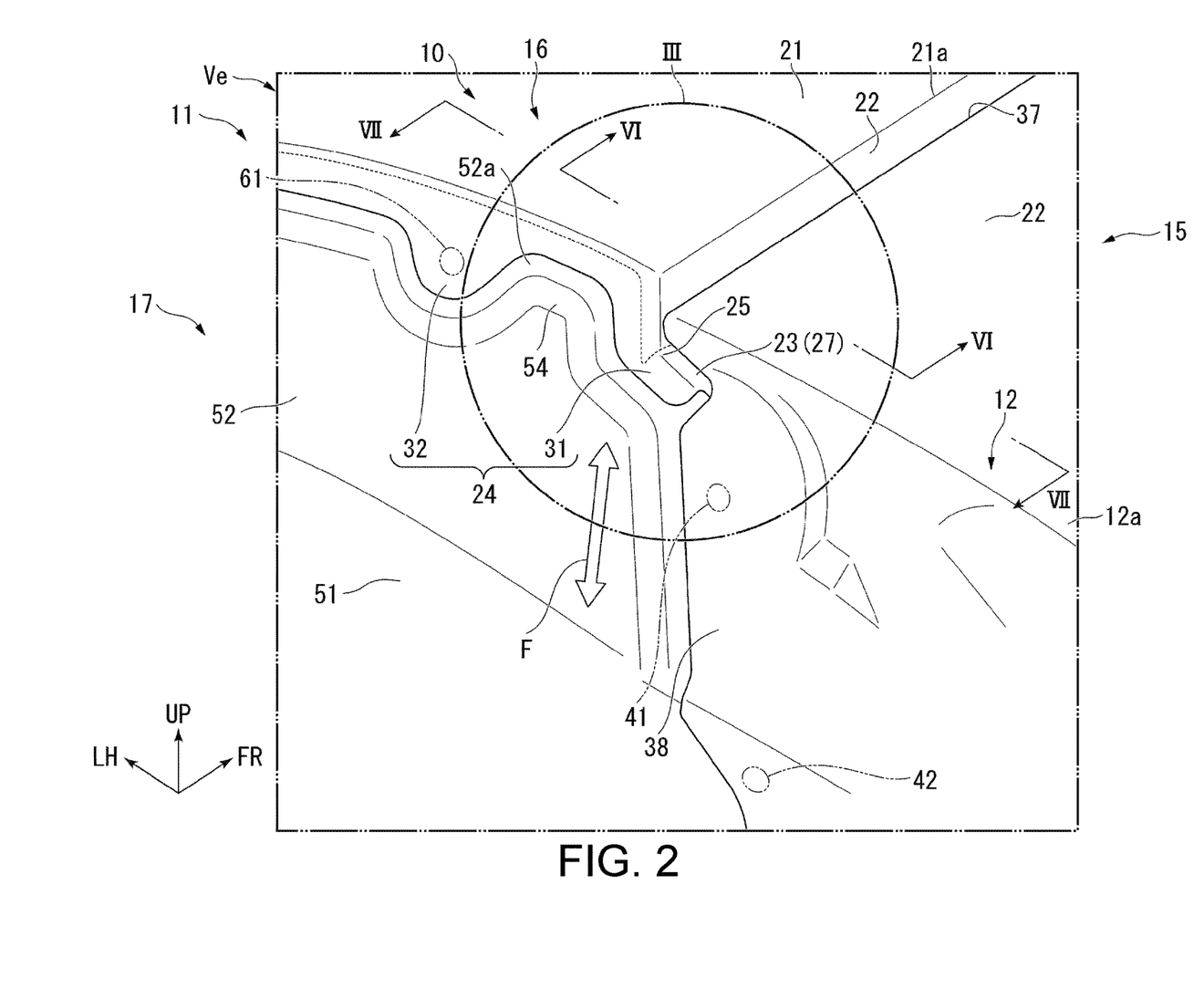
FIG. 2 is a perspective view of the roof structure of one embodiment when viewed obliquely from above the back of a vehicle body.

As shown in FIG. 1 and FIG. 2, for example, a vehicle Ve includes the roof structure 10 which constitutes a roof of the vehicle and the surrounding of the roof. By a vehicle body back portion of the roof structure 10, for example, an upper portion of a tailgate opening portion 12 is configured at a back portion of a vehicle body 11.

At an upper end portion 12*a* of the tailgate opening portion 12, for example, an upper end portion of a tailgate (not shown) is supported in a way of being opened/closed freely via a hinge. The tailgate opening portion 12 is opened/closed by taking the hinge as an axis and moving the tailgate in an up-down direction.

<Roof structure>

The roof structure 10 includes, for example, a roof panel 15, a roof side outer panel 16 on the left side (roof side outer panel), a rear garter panel 17 on the left side (opening frame panel), a roof side outer panel 18 on the right side (roof side outer panel), and a rear garter panel 19 on the right side (opening frame panel).

The roof structure 10 is configured to be substantially symmetrical in a left-right direction. Accordingly, the roof side outer panel 16 on the left side is abbreviated as "the roof side outer panel 16" to describe, and the rear garter panel 17 on the left side is abbreviated as "the rear garter panel 17" to describe. In addition, detailed descriptions of the roof side outer panel 18 on the right side and the rear garter panel 19 on the right side are omitted.

(Roof side outer panel)

Figure 3:
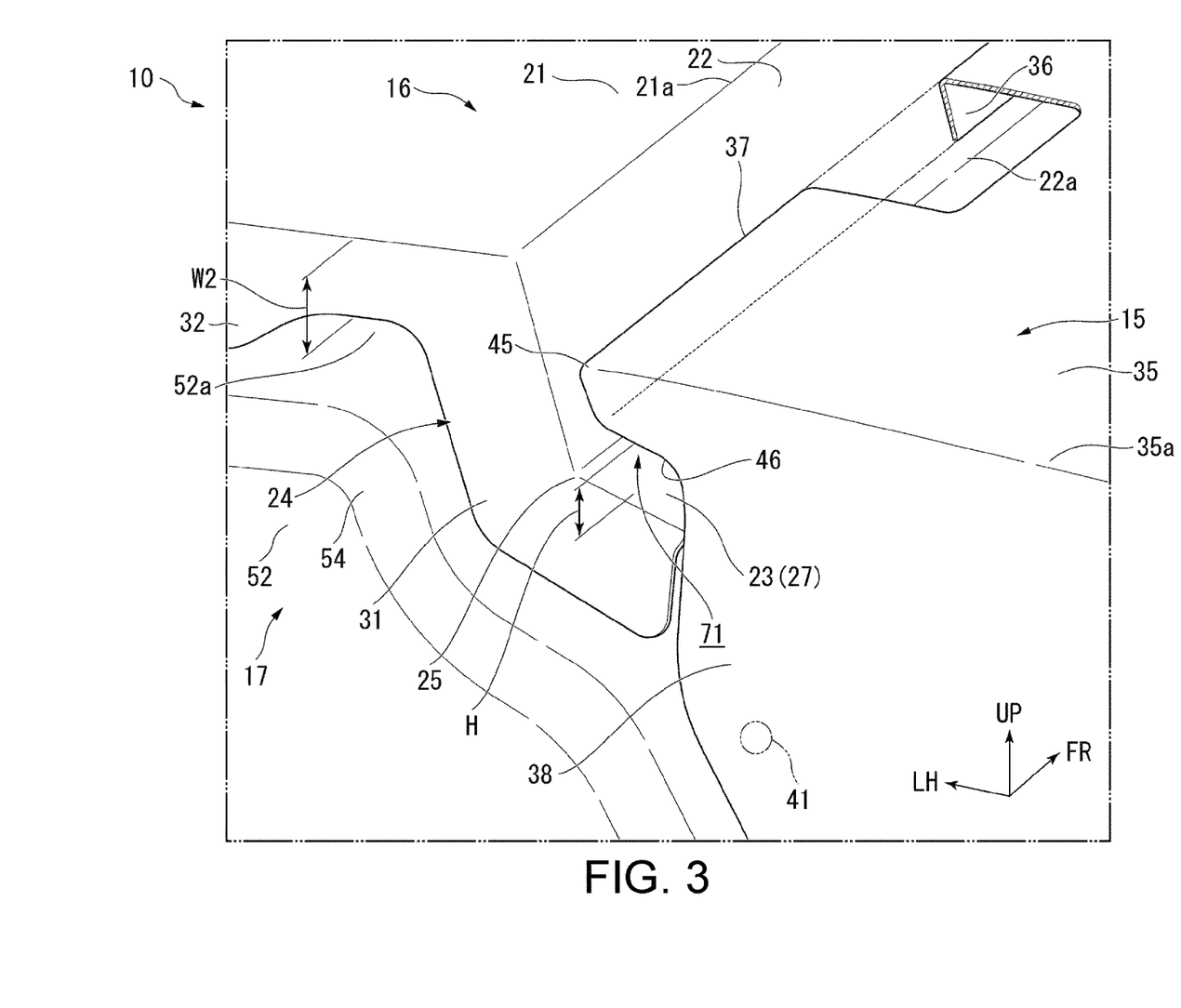
FIG. 3 is a perspective view in which a III part of FIG. 2 is enlarged.
Figure 4:
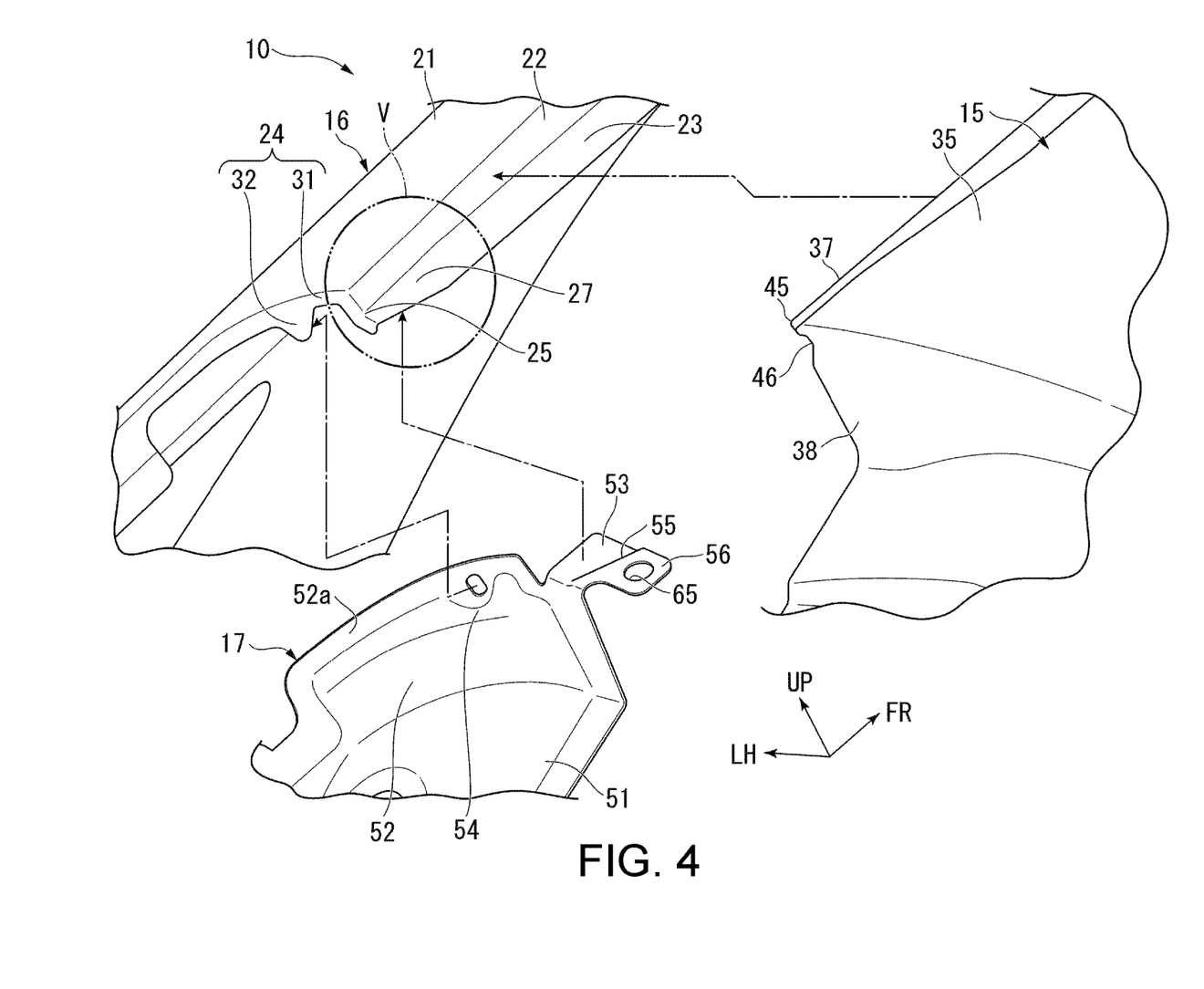
FIG. 4 is a perspective view in which the roof structure of one embodiment is disassembled.

As shown in FIG. 3 and FIG. 4, the roof side outer panel 16 has a side outer panel main body 21, a roof joint surface portion 22, an up-down direction joint surface portion 23, a front-back direction joint surface portion 24, and a back end corner portion (intersection end corner portion) 25. With regard to the roof side outer panel 16, the roof joint surface portion 22, the up-down direction joint surface portion 23, the front-back direction joint surface portion 24, and the back end corner portion 25 are integrally bent and formed by, for example, press-molding a steel plate.

The side outer panel main body 21 is, for example, an exterior panel that forms a surface of a left side portion of the vehicle body 11. The roof joint surface portion 22 is formed in continuity with an upper edge 21*a* of the side outer panel main body 21.

The roof joint surface portion 22 extends along the upper edge 21*a* of the side outer panel main body 21 in a vehicle body front-back direction. The roof joint surface portion 22 is formed downward in a downslope as directed from the upper edge 21*a* of the side outer panel main body 21 toward the inner side in a vehicle width direction.

In a state of being abutted against the roof joint surface portion 22, an abutment joint portion 37 (described later) of the roof panel 15 is continuously joined to the roof joint surface portion 22 toward the vehicle body front-back direction by, for example, brazing.

The up-down direction joint surface portion 23 is formed in continuity with a lower edge (lower end) 22*a* of the roof joint surface portion 22.

The up-down direction joint surface portion 23 extends along the lower edge 22*a* of the roof joint surface portion 22 in the vehicle body front-back direction. The up-down direction joint surface portion 23 is formed in a way of projecting substantially horizontally from the lower edge 22*a* of the roof joint surface portion 22 toward the inner side in the vehicle width direction. The up-down direction joint surface portion 23 has a joint apex portion 27 at the back end portion of the vehicle body.

Figure 5:
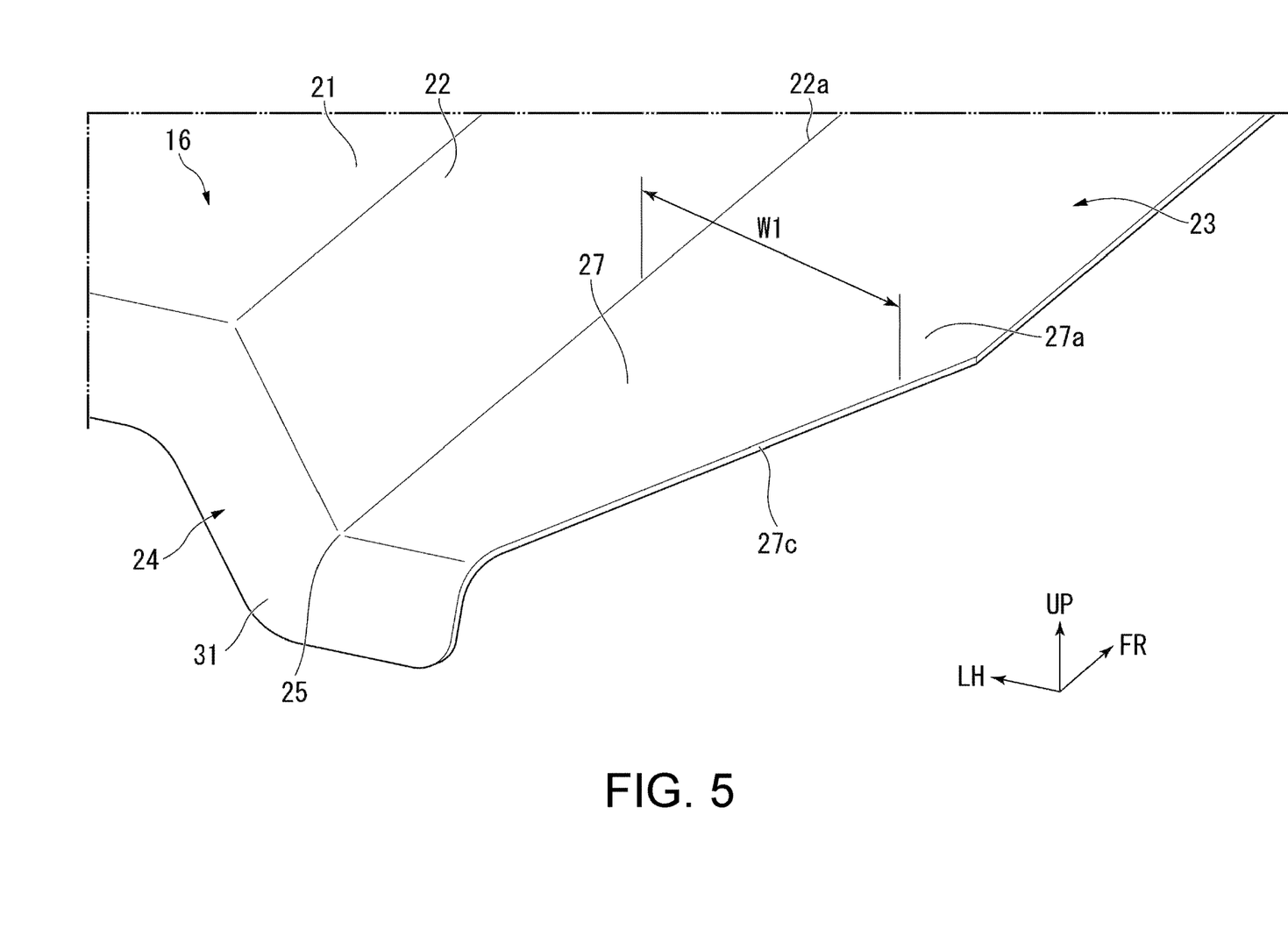
FIG. 5 is a perspective view in which a V part of FIG. 4 is enlarged.
Figure 6:
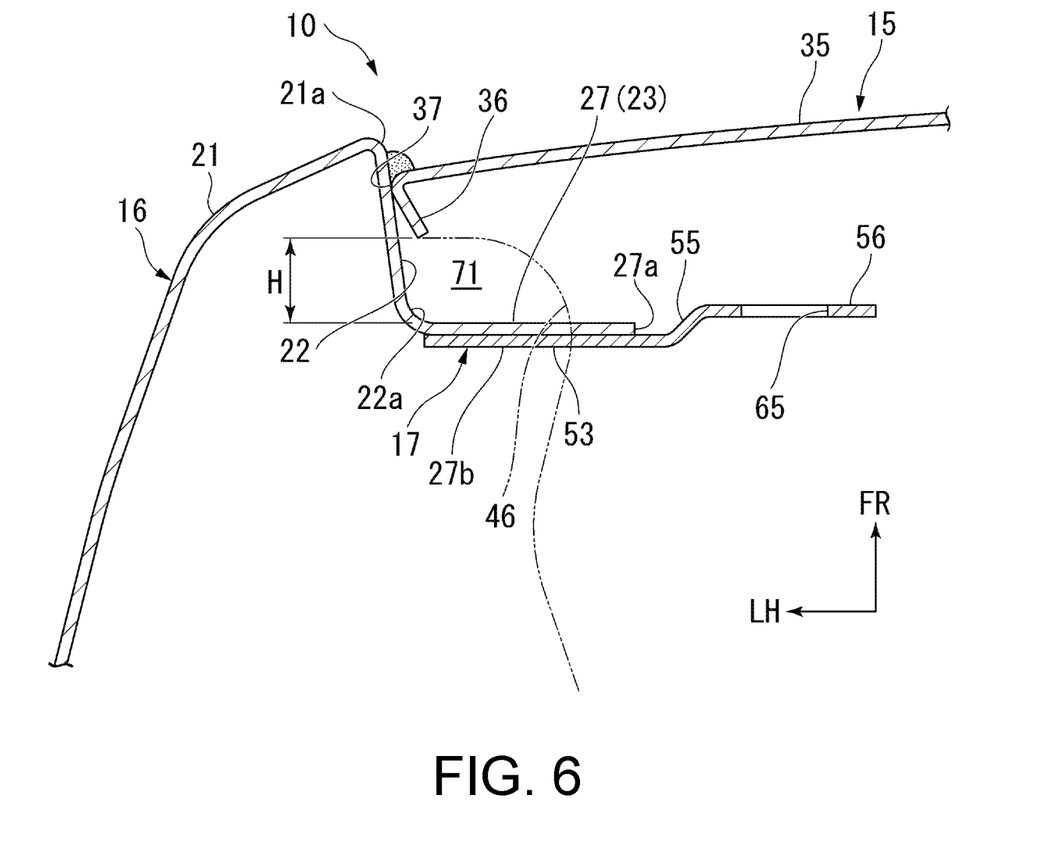
FIG. 6 is a cross-sectional view broken along a VI-VI line of FIG. 2.

As shown in FIG. 5 and FIG. 6, the joint apex portion 27 is formed in a way that an apex portion distance W1 is gradually reduced from a base end portion 27*a* toward the back end corner portion 25 (that is, the front-back direction joint surface portion 24). The apex portion distance W1 is a distance (for example, a width in the vehicle width direction) from the lower edge 22*a* of the roof joint surface portion 22 to an inclined edge 27*c*.

The reason for forming the apex portion distance W1 of the joint apex portion 27 in a way that the apex portion distance W1 is gradually reduced toward the back end corner portion 25 is described later in detail.

A horizontal wall 53 (described later) of the rear garter panel 17 is joined to a lower surface 27*b* of the joint apex portion 27 in the up-down direction by, for example, spot welding.

As shown in FIG. 3 and FIG. 4, the front-back direction joint surface portion 24 is formed in continuity with back joint ends (end portions) of the side outer panel main body 21, the up-down direction joint surface portion 23, and the roof joint surface portion 22 in the vehicle body front-back direction.

The front-back direction joint surface portion 24 is joined to an upper end portion 52a (described later) of a vertical wall 52 of the rear garter panel 17 in the vehicle body front-back direction by, for example, spot welding. The front-back direction joint surface portion 24 has a projecting flange 31 and a joint seat portion (joint seat surface) 32.

The projecting flange 31 projects downward in a way of contacting along the upper end portion 52a of the vertical wall 52 of the rear garter panel 17 from a back end (end portion) of the roof side outer panel 16 in the vehicle body front-back direction. The projecting flange 31 is formed to have a minimum width (shortest width) W2 within a range in which the roof joint surface portion 22, the up-down direction joint surface portion 23, and the front-back direction joint surface portion 24 can be press-molded on the roof side outer panel 16.

That is, for example, from the viewpoint of the extensibility of the steel plate, it is relatively difficult to integrally press-mold the roof joint surface portion 22, the up-down direction joint surface portion 23, and the front-back direction joint surface portion 24 on the roof side outer panel 16. Thus, the projecting flange 31 is formed to have the minimum width W2 within a range in which the roof joint surface portion 22, the up-down direction joint surface portion 23, and the front-back direction joint surface portion 24 of the roof side outer panel 16 can be press-molded.

Thereby, the press-molding of the roof joint surface portion 22, the up-down direction joint surface portion 23, and the front-back direction joint surface portion 24 can be improved on the roof side outer panel 16. Additionally, the roof side outer panel 16 can be reduced in weight by forming the projecting flange 31 into the minimum width W2.

As shown in FIG. 2, the joint seat portion 32 projects from the projecting flange 31 to the opposite side of the back end of the roof side outer panel 16. The joint seat portion 32 is joined to the upper end portion 52a (described later) of the vertical wall 52 of the rear garter panel 17 by, for example, spot welding.

As shown in FIG. 5, a three-surface combination portion of the roof joint surface portion 22, the up-down direction joint surface portion 23 (specifically, the joint apex portion 27), and the front-back direction joint surface portion 24 (specifically, the projecting flange 31) is integrally and continuously formed. The three joint surface portions 22, 23, and 24 are formed continuously and intersected with each other, and thereby the back end corner portion 25 is formed into, for example, a triangular corner portion.

The triangular corner portion is formed by the intersection of the three joint surface portions 22, 23, and 24, and thereby the rigidity of the back end corner portion 25 is ensured to be high. Accordingly, the rigidity of the roof side outer panel 16 is increased by the back end corner portion 25.

Here, the back end corner portion 25 is a part in which the roof joint surface portion 22, the up-down direction joint surface portion 23, and the front-back direction joint surface portion 24 are continuously intersected with each other, and is a part in which press-molding is difficult from the viewpoint of, for example, the extensibility of the steel plate.

Thus, the joint apex portion 27 of the up-down direction joint surface portion 23 is arranged adjacent to the back end corner portion 25. The joint apex portion 27 is formed in a way that the apex portion distance W1 from the lower edge 22a of the roof joint surface portion 22 to the inclined edge 27c is gradually reduced toward the back end corner portion 25. Accordingly, the extensibility of the steel plate can be ensured when the roof side outer panel 16 is press-molded. Thereby, the back end corner portion 25 (that is, the roof joint surface portion 22, the up-down direction joint surface portion 23, and the front-back direction joint surface portion 24) can be easily formed by press-molding.

(Roof panel) As shown in FIG. 3 and FIG. 4, the roof panel 15 is arranged on the inner side of the roof side outer panel 16 in the vehicle width direction.

The roof panel 15 has: a roof panel main body 35, a roof panel flange 36, the abutment joint portion 37, and a garter joint surface portion 38. With regard to the roof panel 15, the roof panel flange 36, the abutment joint portion 37, and the garter joint surface portion 38 are integrally bent and formed by, for example, press-molding a steel plate.

The roof panel main body 35 is, for example, an exterior panel that forms a surface of the roof of the vehicle body 11. The roof panel flange 36 is formed in continuity with a left side edge of the roof panel main body 35 in the vehicle width direction.

The roof panel flange 36 is formed downward in a downslope along the roof joint surface portion 22 as directed from the left side edge of the roof panel main body 35 toward the inner side in the vehicle width direction. That is, the roof panel flange 36 extends along the left side edge of the roof panel main body 35 in the vehicle body front-back direction.

The abutment joint portion 37 is formed at an intersection portion between the roof panel main body 35 and the roof panel flange 36 (that is, at the left side edge of the roof panel main body 35). In a state of being abutted against the roof joint surface portion 22 from the inner side in the vehicle width direction, the abutment joint portion 37 extends continuously along the roof joint surface portion 22 in the vehicle body front-back direction. The abutment joint portion 37 is continuously joined to the roof joint surface portion 22 in the vehicle body front-back direction by, for example, brazing of a copper alloy.

In addition, the garter joint surface portion 38 is formed in continuity with a back end 35a of the roof panel main body 35 in the vehicle body front-back direction.

The garter joint surface portion 38 is formed downward along the vertical wall 52 (described later) of the rear garter panel 17 from the back end 35a of the roof panel main body 35. The garter joint surface portion 38 is superimposed on the vertical wall 52 of the rear garter panel 17 from the back side of the vehicle body. With regard to the garter joint surface portion 38, a joint portion 41 is joined (point-joined) to the vertical wall 52 of the rear garter panel 17 in the vehicle body front-back direction by, for example, spot welding or the like.

Furthermore, with regard to the garter joint surface portion 38, a joint portion 42 is joined (point-joined) to a garter panel main body 51 of the rear garter panel 17 by, for example, spot welding or the like.

In this way, the abutment joint portion 37 of the roof panel 15 is continuously joined to the roof joint surface portion 22 of the roof side outer panel 16 in the vehicle body front-back direction in a state of being abutted against the roof joint surface portion 22 of the roof side outer panel 16. Furthermore, the garter joint surface portion 38 of the roof panel 15 is joined to the vertical wall 52 of the rear garter panel 17 in the vehicle body front-back direction.

Thereby, the strength and rigidity of the roof structure 10 configured by the roof side outer panel 16, the roof panel 15, the rear garter panel 17, and the like can be increased.

Here, with regard to the roof panel 15, the roof panel flange 36, the abutment joint portion 37, and the garter joint surface portion 38 are bent and formed by, for example, press-molding.

Therefore, the roof panel flange 36, the abutment joint portion 37, and the garter joint surface portion 38 are continuously intersected with each other, and thereby a roof panel corner portion 45 is formed at, for example, a left side back end of the roof panel 15.

Here, when the roof panel corner portion 45 is press-molded, a recess 46 is formed in the garter joint surface portion 38 in consideration of the extensibility of a steel plate for press-molding. The recess 46 is described later in detail.

(Rear garter panel)

Figure 7:
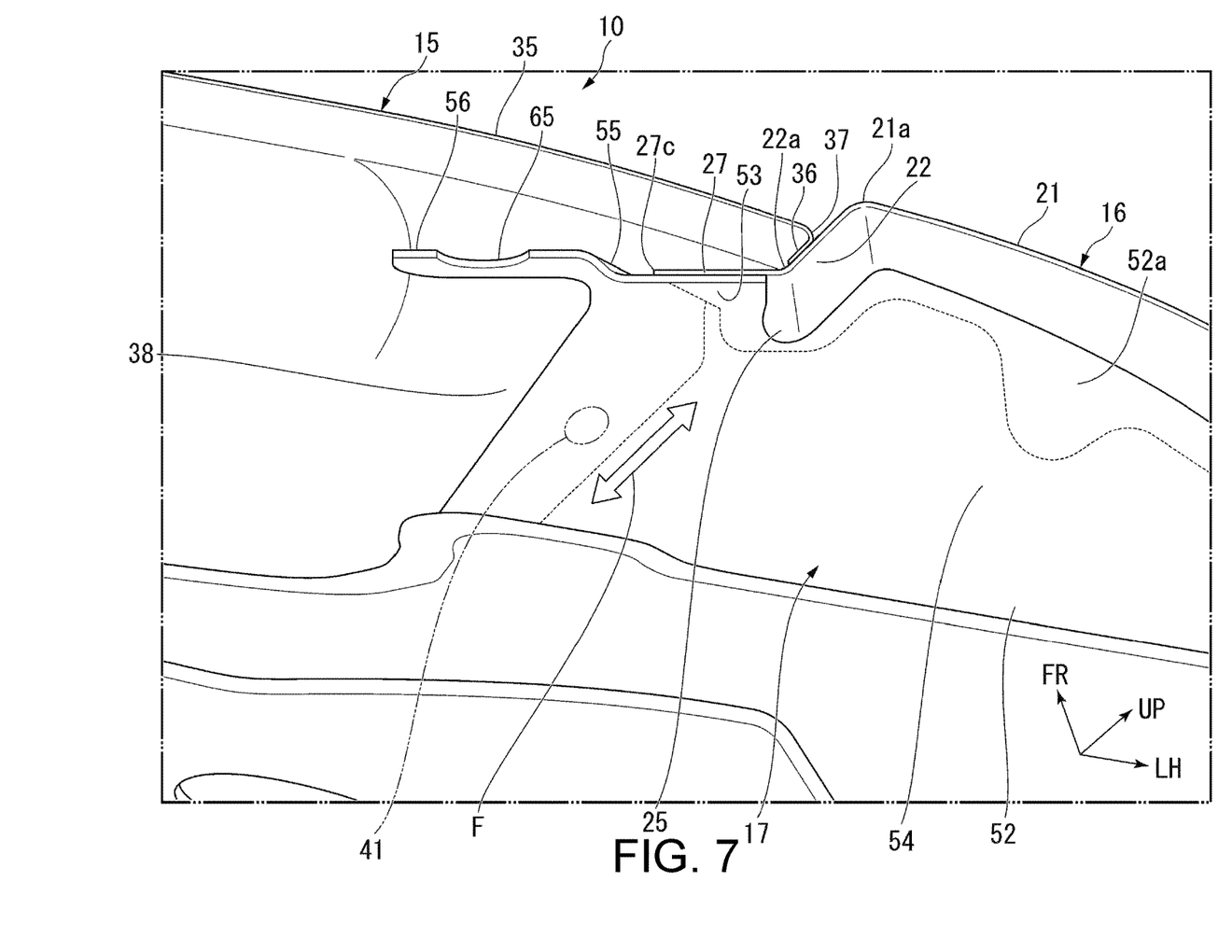
FIG. 7 is a perspective view broken along a VII-VII line of FIG. 2.

As shown in FIG. 2 and FIG. 7, the rear garter panel 17 is joined to the back ends (end portions) of the roof side outer panel 16 and the roof panel 15 in the vehicle body front-back direction.

That is, the rear garter panel 17 is joined to, for example, the front-back direction joint surface portion 24 (specifically, the projecting flange 31 and the joint seat portion 32) of the roof side outer panel 16. In addition, the rear garter panel 17 is joined to, for example, the joint apex portion 27 of the roof side outer panel 16.

Furthermore, the rear garter panel 17 is joined to, for example, the garter joint surface portion 38 of the roof panel 15.

Figure 8:
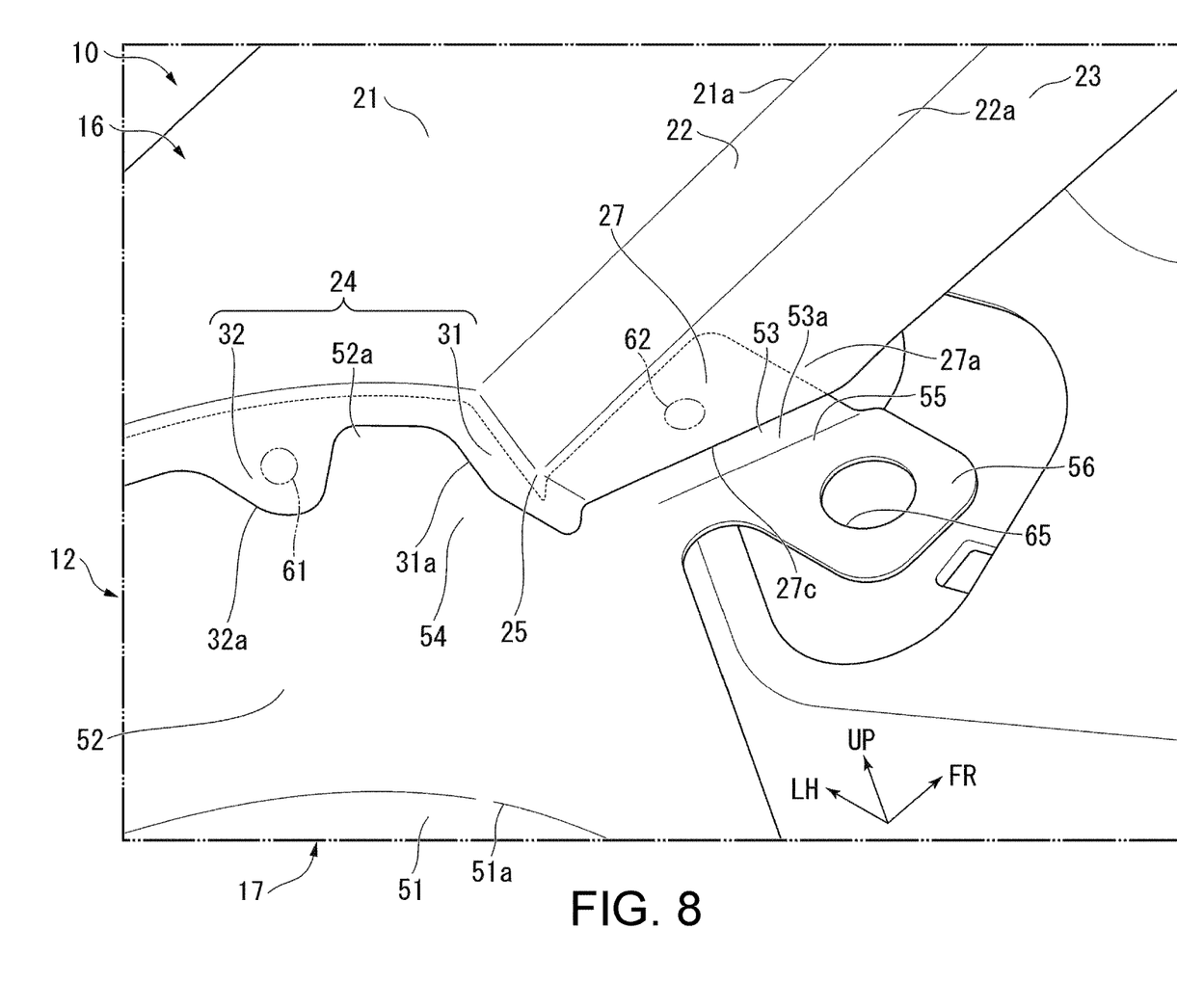
FIG. 8 is a perspective view showing a state in which a roof panel is removed from the roof structure of one embodiment.
Figure 9:
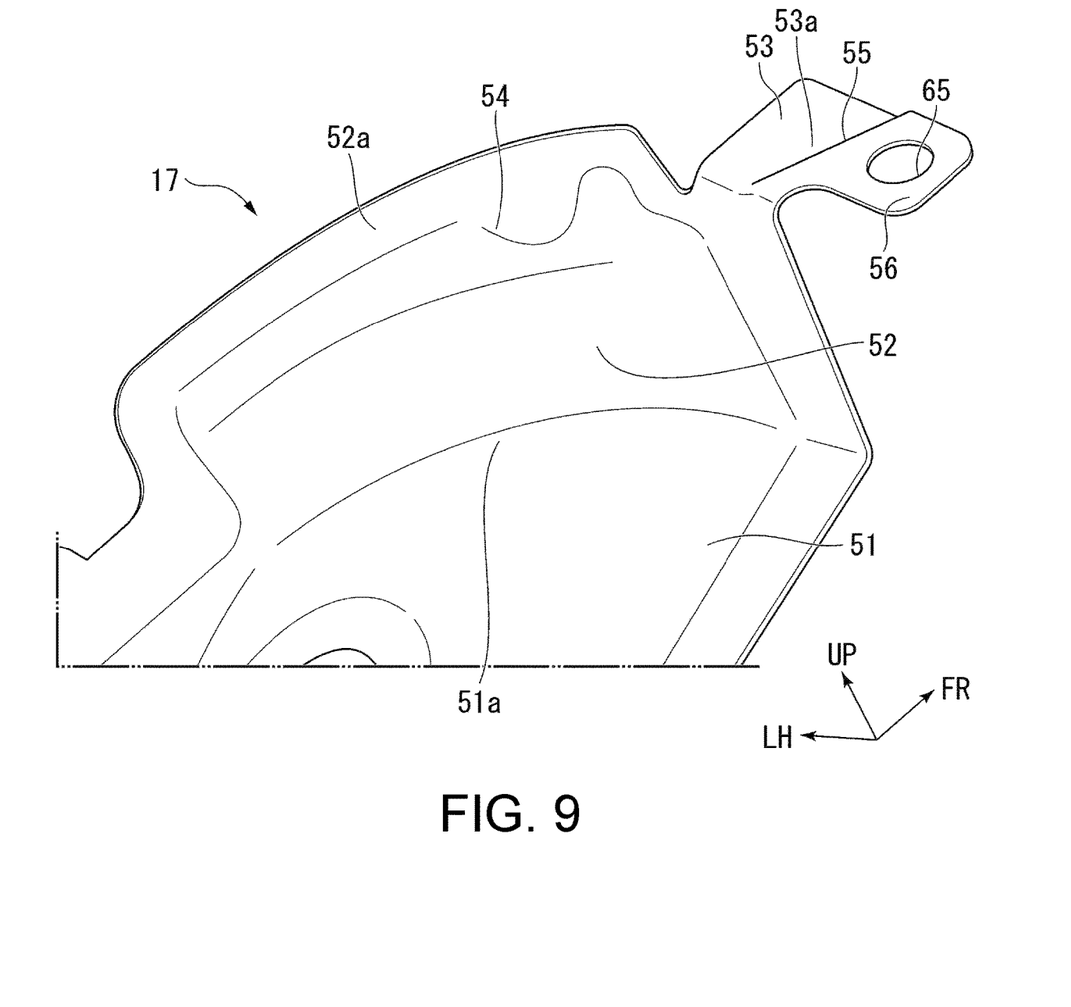
FIG. 9 is a perspective view in which a rear garter panel of FIG. 4 is enlarged.

As shown in FIG. 8 and FIG. 9, the rear garter panel 17 has: the garter panel main body 51, the vertical wall 52, the horizontal wall 53, a first stepped portion (stepped portion) 54, a second stepped portion (stepped portion) 55, and a seat surface portion 56. With regard to the rear garter panel 17, the vertical wall 52, the horizontal wall 53, the first stepped portion 54, the second stepped portion 55, and the seat surface portion 56 are integrally bent and formed by, for example, press-molding a steel plate.

The garter panel main body 51 is, for example, a panel that constitutes a part of a left upper portion of the tailgate opening portion 12 (also see FIG. 1). The vertical wall 52 is formed at a front edge 51a of the garter panel main body 51 on the front side of the vehicle body.

The vertical wall 52 is disposed vertically by being raised from the front edge 51a of the garter panel main body 51. The projecting flange 31 and the joint seat portion 32 of the front-back direction joint surface portion 24 are superimposed on the upper end portion 52a of the vertical wall 52 from the back side of the vehicle body. The joint seat portion 32 is joined (point-joined) to the upper end portion 52a of the vertical wall 52 by a joint portion 61 in the vehicle body front-back direction by, for example, spot welding.

In addition, the horizontal wall 53 is formed at an inner end of the vertical wall 52 on the inner side in the vehicle width direction.

The horizontal wall 53 extends substantially horizontally along the joint apex portion 27 of the up-down direction joint surface portion 23 from the inner end of the vertical wall 52 on the inner side in the vehicle width direction toward the front side of the vehicle body. The horizontal wall 53 is horizontally disposed in a state of being in contact with the lower surface 27b (see FIG. 6) of the joint apex portion 27, and is, for example, joined (point-joined) to the joint apex portion 27 from below by spot welding by a joint portion 62 in the up-down direction.

Here, the vertical wall 52 is vertically disposed, and the horizontal wall 53 is horizontally disposed. Accordingly, the vertical wall 52 and the horizontal wall 53 are disposed in a way of being intersected with each other. Thereby, the joint seat portion 32 is joined to the upper end portion 52a of the vertical wall 52, and the joint apex portion 27 is joined to the horizontal wall 53, and thereby the joining strength between the rear garter panel 17 and the roof side outer panel 16 can be increased.

The first stepped portion 54 is formed in the vicinity of the lower side of the upper end portion 52a of the vertical wall 52.

The first stepped portion 54 is formed (shaped) in a stepped shape along an outer peripheral edge 31a of the projecting flange 31 and an outer peripheral edge 32a of the joint seat portion 32 of the front-back direction joint surface portion 24. Specifically, for example, the first stepped portion 54 is formed in the vicinity of the lower side of the upper end portion 52a of the vertical wall 52 by a bead or the like raised toward the back side of the vehicle body. The first stepped portion 54 is formed in a way of facing the outer peripheral edge 31a of the projecting flange 31 and the outer peripheral edge 32a of the joint seat portion 32.

Thereby, for example, the outer peripheral edge 31a of the projecting flange 31, the outer peripheral edge 32a of the joint seat portion 32, and the first stepped portion 54 can be easily positioned.

In addition, the second stepped portion 55 is formed on the horizontal wall 53.

The second stepped portion 55 is formed (shaped) in a stepped shape along the inclined edge 27c of the joint apex portion 27 on the inner side in the vehicle width direction of the inclined edge (the outer peripheral edge of the roof side outer panel) 27c of the joint apex portion 27. Specifically, for example, the second stepped portion 55 is formed by a bead or the like that is raised upward from an inclined side 53a of the horizontal wall 53 on the inner side in the vehicle width direction of the inclined edge 27c. The second stepped portion 55 is formed in a way of facing the inclined edge 27c of the joint apex portion 27.

Thereby, for example, the inclined edge 27c of the joint apex portion 27 and the second stepped portion 55 can be easily positioned.

It should be noted that in the embodiment, a bead is illustrated as the first stepped portion 54 and the second stepped portion 55, but the first stepped portion 54 and the second stepped portion 55 are not limited to the bead.

In this way, the outer peripheral edge 31a of the projecting flange 31, the outer peripheral edge 32a of the joint seat portion 32, and the first stepped portion 54 can be positioned, and the inclined edge 27c of the joint apex portion 27 and the second stepped portion 55 can be positioned.

Accordingly, the rear garter panel 17 and the roof side outer panel 16 can be assembled using the first stepped portion 54 and the second stepped portion 55 as a guide (reference). Thereby, the assembly work of the rear garter panel 17 and the roof side outer panel 16 can be facilitated.

The seat surface portion 56 is formed at the second stepped portion 55.

For example, the seat surface portion 56 protrudes substantially horizontally from the second stepped portion 55 toward the inner side in the vehicle width direction. Accordingly, the seat surface portion 56 is disposed separately from the inclined edge 27c of the joint apex portion 27 toward the inner side in the vehicle width direction, and is located on the outer side of the inclined edge 27c. Furthermore, the seat surface portion 56 is disposed below the roof panel main body 35 with an interval therebetween (see FIG. 7).

The seat surface portion 56 has a positioning hole 65 penetrating in the up-down direction.

The positioning hole 65 is, for example, a hole used for positioning the rear garter panel 17 with respect to the roof side outer panel 16.

Thereby, by utilizing the positioning hole 65 of the seat surface portion 56, for example, a joint position between the joint apex portion 27 and the horizontal wall 53 can be accurately determined.

As described above, according to the roof structure 10 of the embodiment, as shown in FIG. 3 and FIG. 4, the roof joint surface portion 22, the up-down direction joint surface portion 23, and the front-back direction joint surface portion 24 are integrally formed on the roof side outer panel 16.

The abutment joint portion 37 of the roof panel 15 is joined to the roof joint surface portion 22 in the vehicle body front-back direction in a state of being abutted against the roof joint surface portion 22. The up-down direction joint surface portion 23 is formed in a way of being continuous to the lower edge 22*a* of the roof joint surface portion 22. The horizontal wall 53 of the rear garter panel 17 is joined to the joint apex portion 27 of the up-down direction joint surface portion 23 in the up-down direction.

Furthermore, the front-back direction joint surface portion 24 is formed on the side outer panel main body 21, the roof joint surface portion 22, and the up-down direction joint surface portion 23 (the joint apex portion 27) in a way of being continuous to the back ends thereof in the vehicle body front-back direction. The upper end portion 52*a* of the vertical wall 52 of the rear garter panel 17 is joined to the front-back direction joint surface portion 24 in the vehicle body front-back direction.

Additionally, the garter joint surface portion 38 of the roof panel 15 is joined to the vertical wall 52 of the rear garter panel 17.

That is, by integrally forming the roof joint surface portion 22, the up-down direction joint surface portion 23, and the front-back direction joint surface portion 24 on the roof side outer panel 16, the roof panel 15 and the rear garter panel 17 can be joined together to each of the joint surface portions 22, 23, and 24.

Here, on the roof panel 15, the roof panel flange 36, the abutment joint portion 37, and the garter joint surface portion 38 are continuously intersected with each other, and thereby the roof panel corner portion 45 is press-molded. In consideration of the extensibility of the steel plate in the press-molding of the roof panel corner portion 45, the recess 46 is formed in the garter joint surface portion 38.

Therefore, in a state that the three components (panels) 15, 16, and 17, namely the roof panel 15, the roof side outer panel 16, and the rear garter panel 17, are joined together, and a gap 71 is formed by the recess 46. When the gap 71 is large, it is difficult to stop water by the gap 71, and a bracket which is a separate member is considered to be used as a measure to stop water.

Thus, the up-down direction joint surface portion 23 is formed integrally in continuity with the lower edge 22*a* of the roof joint surface portion 22, and the front-back direction joint surface portion 24 is formed integrally in continuity with the up-down direction joint surface portion 23. Thus, the strength and rigidity of the three-surface combination portion of the three joint surface portions 22, 23, and 24 are improved, and thus the up-down direction joint surface portion 23 (that is, the joint apex portion 27) can be moved upward and brought close to the side of the roof panel 15.

Thereby, in a state that the three components (panels) 15, 16, and 17, namely the roof panel 15, the roof side outer panel 16, and the rear garter panel 17, are joined together, a distance H (also see FIG. 6) of the gap 71 in the up-down direction can be suppressed to be small. The distance H of the gap 71 in the up-down direction is a distance from the roof panel 15 to the joint apex portion 27 in the up-down direction.

In this way, by suppressing the distance H of the gap 71 in the up-down direction to be small, the gap 71 formed between the roof panel 15 and the joint apex portion 27 can be sufficiently reduced, and water stopping can be ensured by the gap 71.

Furthermore, according to the roof structure 10, the roof joint surface portion 22, the up-down direction joint surface portion 23, and the front-back direction joint surface portion 24 can be set small on the roof side outer panel 16, and thus press-molding can be easily performed.

Additionally, the press-molding mold can be simplified, and the degree of freedom in design can be increased.

Furthermore, as shown in FIG. 2 and FIG. 7, the roof joint surface portion 22, the up-down direction joint surface portion 23 (specifically, the joint apex portion 27), and the front-back direction joint surface portion 24 are continuously intersected with each other, and thereby the back end corner portion 25 having high rigidity is formed. Accordingly, the rigidity of the roof side outer panel 16 is increased by the back end corner portion 25.

Thereby, for example, a load F caused by vertical vibration transmitted from the rear garter panel 17 can be supported by the back end corner portion 25, and can be further distributed from the back end corner portion 25 to the entire region of the roof side outer panel 16. In addition, the three-surface combination portion of the three joint surface portions 22, 23, and 24 also has the same effect.

It should be noted that the technical scope of the disclosure is not limited to the above embodiment, and various modifications can be added without departing from the gist of the disclosure.

For example, in the above embodiment, an example is described in which the roof structure 10 is configured at the back end as the end portion in the vehicle body front-back direction, but the disclosure is not limited hereto. As another example, for example, the roof structure may be configured at the front end or the like in the vehicle body front-back direction.

In addition, within a range not departing from the gist of the disclosure, the constituent elements in the above embodiment can be appropriately replaced by well-known constituent elements, and the variation examples described above may be appropriately combined.

What is claimed is:

1. A roof structure of a vehicle,
    in which a roof side outer panel, a roof panel which is arranged on an inner side of the roof side outer panel in a vehicle width direction, and an opening frame panel which is arranged at end portions of the roof panel and the roof side outer panel in a vehicle body front-back direction are joined,
    wherein, with regard to the roof side outer panel, a roof joint surface portion, an up-down direction joint surface portion and a front-back direction joint surface portion are continuously formed,
    wherein
    the roof joint surface portion to which the roof panel is joined in the vehicle body front-back direction in an abutted state,
    the up-down direction joint surface portion which is formed at a lower end of the roof joint surface portion and to which the opening frame panel is joined in an up-down direction, and the front-back direction joint surface portion which is formed at end portions of the up-down direction joint surface portion and the roof joint surface portion in the vehicle body front-back direction, and is joined to the opening frame panel in the vehicle body front-back direction.

2. The roof structure of a vehicle according to claim 1, wherein the roof side outer panel comprises:
   an intersection end corner portion, which is formed in a way that the roof joint surface portion, the up-down direction joint surface portion, and the front-back direction joint surface portion are intersected with each other.

3. The roof structure of a vehicle according to claim 2, wherein the up-down direction joint surface portion comprises:
   a joint apex portion, which is formed in a way that a distance from the roof joint surface portion to an outer peripheral edge is gradually reduced toward the intersection end corner portion.

4. The roof structure of a vehicle according to claim 1, wherein the front-back direction joint surface portion comprises:
   a projecting flange, which projects in a way of contacting along the opening frame panel from an end portion of the roof side outer panel in the vehicle body front-back direction, and
   a joint seat portion, which projects from the projecting flange to an opposite side of the end portion of the roof side outer panel and is joined to the opening frame panel;
   wherein the projecting flange is formed to have a minimum width within a range in which the roof joint surface portion, the up-down direction joint surface portion, and the front-back direction joint surface portion of the roof side outer panel are capable of being press-molded.

5. The roof structure of a vehicle according to claim 1, wherein the opening frame panel comprises:
   a vertical wall to which the front-back direction joint surface portion is joined; and
   a horizontal wall, which extends along the up-down direction joint surface portion from the vertical wall and is joined to the up-down direction joint surface portion.

6. The roof structure of a vehicle according to claim 1, wherein the opening frame panel comprises:
   a stepped portion, formed in a stepped shape along an outer peripheral edge of the roof side outer panel.

7. The roof structure of a vehicle according to claim 1, wherein the opening frame panel comprises:
   a seat surface portion, which is disposed separately from the up-down direction joint surface portion and is positioned with respect to the roof side outer panel.

8. The roof structure of a vehicle according to claim 1, wherein the roof panel comprises:
   an abutment joint portion, which is joined to the roof joint surface portion in the vehicle body front-back direction in a state of being abutted against the roof joint surface portion; and
   a garter joint surface portion, which is joined to the opening frame panel in the vehicle body front-back direction.

* * * * *